United States Patent

Lane

[15] 3,665,862
[45] May 30, 1972

[54] CASELESS ROCKET CONTAINING SILANE POLYMER

[72] Inventor: George A. Lane, Midland, Mich.
[73] Assignee: The Dow Chemical Company, Midland, Mich.
[22] Filed: Mar. 8, 1962
[21] Appl. No.: 179,511

[52] U.S. Cl. .................................. 102/103, 149/19, 149/20, 149/36, 149/42
[51] Int. Cl. ......................................... F42b 1/00, C06d 5/00
[58] Field of Search ...................................... 149/18–20, 14, 149/36, 42; 102/98, 103; 86/1

[56] References Cited

UNITED STATES PATENTS

| | | | |
|---|---|---|---|
| 2,902,355 | 9/1959 | Eckels | 149/19 X |
| 2,949,352 | 8/1960 | Cramer | 149/19 |
| 3,022,149 | 2/1962 | Cramer | 149/19 |

Primary Examiner—Benjamin R. Padgett
Attorney—W. M. Yates

EXEMPLARY CLAIM

1. A caseless rocket comprising an elongated solid propellant mass consisting essentially of an oxygen-containing oxidizer selected from the group consisting of inorganic and organic perchlorates and nitrates intermixed with a silane polymer selected from the group consisting of polydimethylsilane, polymethyl-hydrogensilane, polydihydrogensilane, copolymers and mixtures thereof reacted with a cross-linking agent for said silane polymer which solidifies and sets said silane polymer thereby to form a solid mass, the surface of said solid propellant mass being coated with a light weight coating having a maximum burning rate of less than 1 percent of that of said solid propellant mass on all sides other than one end.

11 Claims, No Drawings

CASELESS ROCKET CONTAINING SILANE POLYMER

This invention pertains to a caseless rocket and a method for its preparation.

The ultimate in rocket design is a caseless rocket which consists entirely of propellant with no inert component or structure such as nozzle or combustion chamber. Such a rocket may be obtained by forming the propellant in the desired shape and burning the propellant in a manner such that the required thrust is obtained without the use of a nozzle or a combustion chamber.

This invention pertains to a caseless rocket comprising an elongated solid propellant mass containing an oxygen containing oxidizer intermixed with a silane polymer selected from the group consisting of polydimethylsilane, polymethylhydrogensilane, polydihydrogensilane, copolymers and mixtures thereof reacted with a cross-linking agent to form a solid. The silane polymer serves as a fuel and binder to form a solid propellant. The resulting propellant mass is coated with a non-burning coating on all sides other than one end. The rocket made of a propellant containing the above cited silane polymers and thus coated with a non-burning coating results in an unidirectional burning propellant such that a nozzle or a combustion chamber is not necessary. The rocket may be utilized in low pressure environment such as the outer space or high altitudes. It may be used as the final stage in multistage vehicles, as rockets for adjusting orbits, stabilizing rockets, retro-rockets for re-entry or space missions and the like. The propellant to be used as a caseless rocket must burn at very low pressures and should have a high burning rate at these low pressures. The rocket of this invention has these characteristics, while solid propellants as a rule burn slowly and poorly or not at all at pressures in the vicinity of a 0.2 atmosphere and below.

The caseless rockets according to this invention are made from propellants which are made by intimately intermixing the silicon-containing polymers such as polydimethylsilane, polymethylhydrogensilane, polydihydrogensilane, copolymers of these materials and mixtures thereof with an oxygen-containing oxidizer and a cross-linking agent. The propellant thus prepared is formed to the desired shape and then maintained in the particular shape until the silane polymer has set. The silane polymers used contain from five to 20 monomer units, preferably eight to 15, and are liquids in the unset state. The surface of the propellant mass is then coated with a non-burning coating on all sides except the end from which the ignition is to be made and the burning started. The combination of the polysilane as a binder-fuel and an oxygen-containing oxidizer result in a rapid, smooth burning propellant which will oxidize rapidly at low pressures.

Examples of the oxygen-containing oxidizers which may be used in the formation of the propellants include the perchlorates and nitrates of ammonium and of metals, such as magnesium, lithium, beryllium, sodium, potassium and aluminum; hydrazine, nitroformates, and nitronium perchlorate; and coordination compounds such as the perchlorate or nitrate salts with bishydrazine, hydroxylamine, guanidine, and triaminoguanidine.

In addition to the silane polymer, other fuels may be incorporated in the propellant if desired. Solid fuels which have high specific impulse and result in low molecular weight compounds being formed are preferred. Examples of fuels which may be added are light weight metals and the hydrides of light weight metals, such as magnesium, aluminum, lithium, or beryllium, and mixtures and alloys of these metals. Complex metal hydrides, such as lithium aluminum hydride, beryllium borohydride, or magnesium aluminum hydride as well as gas producers, such as hydrazine, hydrazinium azide hydrazinate, and triaminoguanadinium azide, are examples of other types of fuels which have the desired properties and may be added.

In preparing the caseless rockets, the additional fuel, the silane polymer and the oxygen-containing oxidizers are intermixed in a manner normally used for the preparation of solid propellants using silicon-containing binders. After these constituents are intermixed, a cross-linking or curing agent is added which will result in the solidification and setting of the polysilane to form a solid mass. Any of the various known curing agents or cross-linking agents may be used. Some of the commonly used cross-linking agents for the silane polymers are butadiene-styrene copolymers, diallyl fumarate, and other butadiene polymers and diallyl esters. After the constituents are intermixed sufficiently to obtain a substantially homogeneous mixture, the mixture is placed in a mold or formed and allowed to stand until the cross-linking agent has had sufficient time to react with the binder to set and form a solid mass. A catalyst, such as peroxide or a ditertiarybutyl peroxide or a palladium catalyst may be added to aid in initiating the cross-linking reaction.

The propellant may be cast, molded, extruded, or formed in different shapes having the desired ballistic characteristics. If desirable, the propellant may be cast in any shape and then cut or machined to obtain the desired shape and size. Generally it is preferred to use the propellant in a relatively small cross-section with respect to its length, such as having a length of about 2 to 1,000 times the cross-sectional dimension, preferably from 10 to 100 times the cross-sectional dimension. When a large thrust is required, these individual strands of propellant, after being coated with the non-burning coating, may be assembled or clustered together to obtain the desired thrust.

A non-burning coating of light weight is generally used for the coating of the individual strands. The materials used do not have to be non-combustible but must have a slow rate of burning such that when compared to the rate of burning of the propellant, it is relatively non-burning. Thus the term "non-burning," as used herein, means having a burning rate at most less than 1 percent of that of the propellant which is relatively non-burning when compared to the burning rate of the propellant. Examples of some of the coatings which may be used are asphalt compositions which carbonize, vinyl and vinylidene chloride coatings, and rubber or silicone based coatings.

The amounts of the individual constituents used in forming the propellant to be used in the caseless rocket may be widely varied. It is generally preferred to use the smallest amount of the silane polymer possible to obtain a propellant having the required strength and add additional fuel. Suitable formulations may be made using as little as 15 weight percent of the polymer. A practical maximum amount of the polymer desired is generally about 35 weight percent. The curing or cross-linking agents used can vary in amount of from around 5 to 50 percent of the weight of the polysilane. Usually 10 to 25 percent of the curing agent on basis of the silane polymer is a satisfactory product. The ratio or amount of oxidizer used is generally within the well known ratios used in other propellants. A sufficient amount of the oxidizer is used to oxidize substantially all of the added fuel and the silane polymer. At times a slight excess of the oxidizer may be preferred. Also additives such as carbon black or aluminum oxide and others may be added to the propellants to make them opaque and thus decrease the rate of heat transfer to the body of the propellant by radiation during burning.

To further illustrate the invention, a polymethylhydrogensilane polymer of about 10 monomer units, diallylfumarate, aluminum oxide and ammonium perchlorate were intermixed to form a mixture containing 22.5 percent of polymethylhydrogensilane, 2.5 percent diallylfumarate, 4 percent aluminum oxide, and 71 percent ammonium perchlorate. The mixture was degassed and cured at 80° C. for 24 hours. The resulting material obtained was cut in strands ¼ × ¼ × 3½ inches long. These strands were coated on four sides with a non-burning coating consisting of a neoprene latex based paint. The burning rates of these strands were determined in a crawford bomb used for the determination of strand rate burning. At an average pressure of 21 pounds per square inch absolute, the burning rate was 1.16 inches per second and at 2 pounds per square inch absolute, it was 1.04 inches per second.

By means of a closed bomb firing, specific impulse for 1,000 pounds per square inch chamber pressure, expanded to 1 atmosphere was determined and found to be in the range of 240 to 255 seconds.

In a manner similar to that described above additional formulations were made using polydimethylsilane, polydihydrogensilane, and dimethylsilane-methylhydrogensilane copolymer as the binder-fuel with and without the addition of other fuels, such as lithium hydride, magnesium hydride, lithium or magnesium aluminum hydride, and the metals themselves as beryllium and aluminum. Oxidizers used included lithium perchlorate and coordination compounds of lithium perchlorate with bishydrazine in addition to ammonium perchlorate.

What is claimed is:

1. A caseless rocket comprising an elongated solid propellant mass consisting essentially of an oxygen-containing oxidizer selected from the group consisting of inorganic and organic perchlorates and nitrates intermixed with a silane polymer selected from the group consisting of polydimethylsilane, polymethyl hydrogensilane, polydihydrogensilane, copolymers and mixtures thereof reacted with a cross-linking agent for said silane polymer which solidifies and sets said silane polymer thereby to form a solid mass, the surface of said solid propellant mass being coated with a light weight coating having a maximum burning rate of less than 1 percent of that of said solid propellant mass on all sides other than one end.

2. A caseless rocket comprising an elongated propellant mass consisting essentially of a solid fuel, an oxygen-containing oxidizer selected from the group consisting of inorganic and organic perchlorates and nitrates intermixed with a silane polymer selected from the group consisting of polydimethylsilane, polymethylhydrogensilane, polydihydrogensilane, copolymers and mixtures thereof reacted with a cross-linking agent selected from the group consisting of butadiene-styrene copolymers, diallyl esters and butadiene polymers to form a solid propellant mass having a length of from 2 to 1,000 times the cross-sectional dimension of the mass, the surface of said propellant mass being coated with a non-burning coating selected from the group consisting of carbonizable asphalt compositions, vinyl chloride coatings, vinylidene chloride coatings, rubber based coatings and silicone based coatings on all sides other than one end.

3. A caseless rocket according to claim 2 wherein the silane polymer is polymethylhydrogensilane.

4. A caseless rocket according to claim 2 wherein the silane polymer is polydimethylsilane.

5. A caseless rocket according to claim 2 wherein the silane polymer is polydihydrogensilane.

6. A caseless rocket according to claim 2 wherein the solid fuel is a light weight metal and the oxidizer is a metal perchlorate.

7. A caseless rocket according to claim 3 wherein the solid fuel is lithium hydride and the oxidizer is ammonium perchlorate.

8. A caseless rocket according to claim 3 wherein the solid fuel is aluminum, the oxidizer is hydrazinium perchlorate and the silane polymer is polymethylhydrogensilane.

9. A process for the preparation of a caseless rocket, which comprises intermixing a silane polymer selected from the group consisting of polydimethylsilane, polymethylhydrogensilane, polydihydrogensilane, copolymers and mixtures thereof, with an oxygen-containing oxidizer selected from the group consisting of inorganic and organic perchlorates and nitrates and a cross-linking agent for the silane polymer which solidifies and sets said silane polymer, forming the resulting mixture into an elongated mass, and coating the surface of the propellant mass other than one end with a light weight coating having a maximum burning rate of less than 1 percent of that of said solid propellant mass.

10. A process for the preparation of a caseless rocket, which comprises intermixing a silane polymer selected from the group consisting of polydimethylsilane, polymethylhydrogensilane, polydihydrogensilane, copolymers and mixtures thereof, with a solid fuel, an oxygen-containing oxidizer selected from the group consisting of inorganic and organic perchlorates and nitrates and a cross-linking agent for the silane polymer which solidifies and sets said silane polymer forming the resulting mixture into an elongated mass, subjecting the elongated mass to sufficient force to maintain the particular shape until the cross-linking reaction between the binder and the cross-linking agent is sufficiently complete to set the mass, and coating the surface of the propellant mass other than one end with a light weight coating having a maximum burning rate of less than 1 percent of that of said solid propellant mass.

11. A process according to claim 10 wherein the silane polymer is polymethylhydrogensilane.

* * * * *